United States Patent [19]

Simon, Jr. et al.

[11] 3,908,530
[45] Sept. 30, 1975

[54] DRIP COFFEE MAKER

[75] Inventors: Albert E. Simon, Jr., Fort Washington, Pa.; William J. Rakocy, Clifton, N.J.

[73] Assignee: North American Philips Corporation, New York, N.Y.

[22] Filed: Aug. 24, 1973

[21] Appl. No.: 391,079

[52] U.S. Cl. ................ 99/307; 99/322; 99/323
[51] Int. Cl.² ........................................ A47J 31/02
[58] Field of Search ............ 99/306, 307, 279, 299, 99/300, 304, 305, 308, 309, 310, 311, 312, 313, 314, 315, 295, 322

[56] References Cited
UNITED STATES PATENTS

| | | | |
|---|---|---|---|
| 1,309,374 | 7/1919 | Swan | 99/311 |
| 3,309,980 | 3/1967 | Bozek | 99/311 |
| 3,358,583 | 12/1967 | Lepoix | 99/307 |
| 3,388,804 | 6/1968 | Hester | 99/322 |
| 3,451,330 | 6/1969 | Bender | 99/299 |

Primary Examiner—Harvey G. Hornsby
Assistant Examiner—James A. Niegowski
Attorney, Agent, or Firm—Frank R. Trifari

[57] ABSTRACT

A domestic coffee maker which is composed of a substantially C-shaped stand with a hot plate on the lower leg, a cold water reservoir in the vertical section, and a spout for the outlet of heated water in the upper leg. A receptacle carrying a novel coffee basket is placed on the hot plate so heated water may pass through the coffee basket. The coffee basket comprises a cylindrical body having an open end and a bottom closed end. A spreader plate is arranged for covering the open end and has a plurality of arcuate slots evenly spaced about the surface of the plate. A rib lies under the slots for restricting the amount of water flowing to the coffee and for preventing backflow of coffee grinds. A plurality of arcuately shaped slots is arranged on the bottom surface of the basket and an arcuate rib overlies the slots on the bottom of the basket.

8 Claims, 13 Drawing Figures

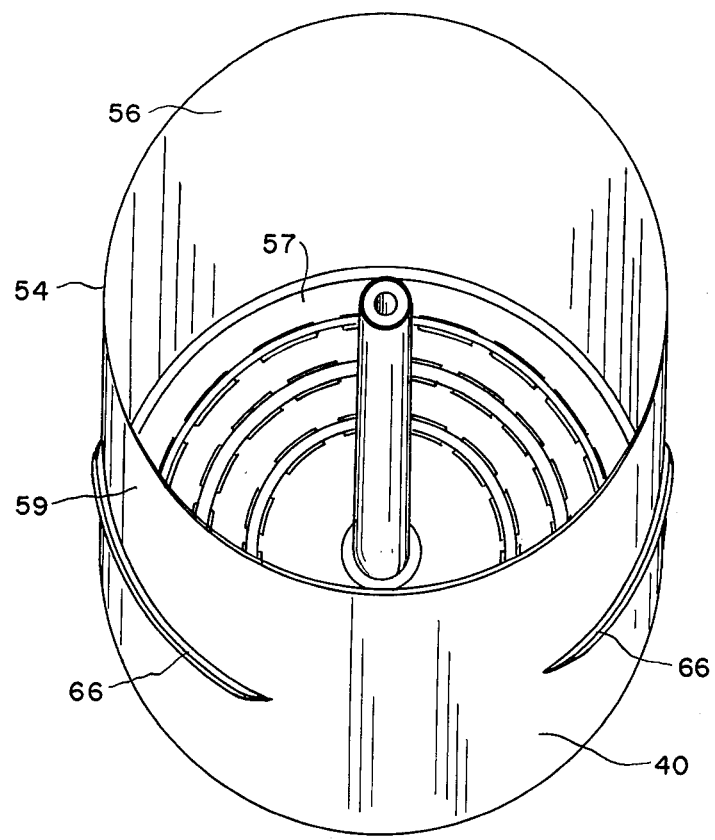
Fig. 5
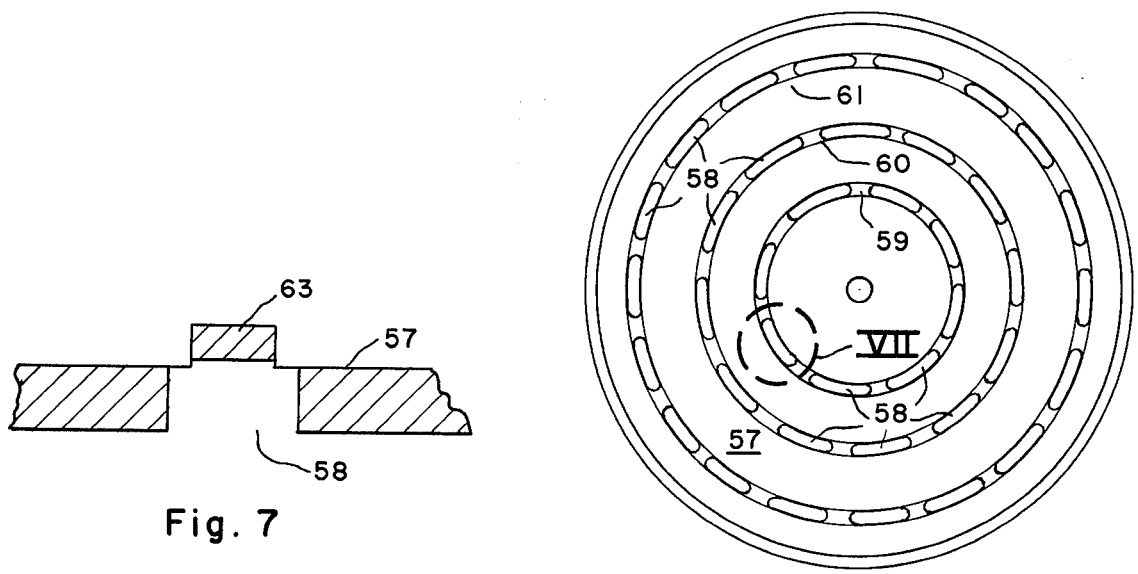
Fig. 7
Fig. 6

DRIP COFFEE MAKER

BACKGROUND OF THE INVENTION

This invention relates generally to the field of coffee making devices, and more particularly to a drip type coffee maker for domestic use employing a novel coffee infusion basket so as to improve the quality of the coffee brew.

It is generally known that the drip brewing process produces a more desirable product than does the other types of brewing processes, such as percolating, where coffee is continuously recirculated through the coffee grounds. In drip brewing the heated water is passed through the ground coffee only once remaining in contact with the coffee for a limited period of time. This type of process is generally accepted as more desirable since it produces a clearer brew without the bitterness being extracted from the coffee grounds such as in percolating processes. For this reason, most commercial coffeemakers are of the drip brewing type.

Only recently have compact drip coffee making apparatus been available for domestic use as well as commercial use. Heretofore drip type coffee makers were used almost exclusively in commercial establishments because a separate heating chamber is required in which the water is first brought to boiling temperature and then passed through the coffee grounds usually contained in a filtering basket. Recent compact drip-type coffee makers have however become available, such as the type shown in recent U.S. Pat. No. 3,587,444. This device has the familiar C-shaped configuration enabling compact design.

The problems of obtaining consistently good quality coffee from these recent domestic type home brewing coffee makers has been a subject of considerable study. The establishment of certain standards by the Coffee Brewing Center have optimized coffee making. Amongst others, the Brewing Center has recommended that a volume of 6 ounces of water be used for each desired serving of brew which may approximate 5½ ounces; that the brewing water must flow uniformly through the coffee bed in the coffee basket; that the temperature of the water brew be between 185° F and 205° F; that the holding temperature after the brew has been made be between 185° F and 190° F for at least one half hour after preparation of the beverage; that the coffee basket be of cylindrical shape; that the water spreading system be designed so as to uniformly deliver brewing water to the grounds that the size of the coffee basket be approximately 50 percent larger than the volume of a full charge of coffee in order to allow for foaming or expansion of the coffee grounds; and that the time it takes for the brewing water to pass through the charge of coffee grounds be no longer than 6 minutes when brewing with drip type grinds in the drip type makers and no longer than eight minutes when brewing with regular grind.

The Coffee Brewing Center considers the brewing time as the most important single factor in beverage preparation. This time factor of brewing water passing through the coffee grounds is perhaps the most difficult of all to control in home equipment devices. A variety of designs have been established for providing a uniform distribution of brewing water through the grounds so that the maximum 6 minute brewing time with drip grind will not be exceeded and so that objectionable foaming or expansion of the coffee grounds is minimized. The spray nozzle of U.S. Pat. No. 3,490,356 is one such attempt and the design of U.S. Pat. No. 3,589,273 is another example. There have also been attempts to supply water to the coffee basket under pressure such as shown in Weber U.S. Pat. No. 3,518,933.

Most of the prior art devices have however been complicated and rarely achieved the desired result of passing the required amount of water through the coffee grinds in the limited amount of time with consistency.

It is accordingly an object of the present invention to provide a coffee maker which meets all the standard requirements of the Coffee Brewing Center and which consistently brews good quality beverage.

A further object of the present invention is to provide a coffee maker in which the brew water completely passes through the coffee grounds in no more than eight minutes nor less than six minutes so as to achieve optimum results when using recommended regular grind.

A still further object of the present invention is to provide a coffee basket for use in a coffee maker which uniformly and evenly distributes the brewing water across the bed of coffee grounds contained therein and which limits objectionable effects of foaming or coffee ground expansion.

Yet a further object is to provide bypass means so as to allow complete brewing in the maximum amount of time permitted, while still extracting sufficient coffee flavor without bitters.

SUMMARY OF THE INVENTION

The above and other objects are generally accomplished by providing a domestic coffee maker having a substantially C-shaped stand with a hot plate on the lower leg and a spout for outlet of heated water in the upper leg. A reservoir for reception of cold water is carried in the vertical section. A receptacle carrying a novel coffee basket is placed on the hot plate and heated water is passed through the basket. The coffee basket comprises a cylindrical body having an open end and a bottom substantially closed end. A spreader plate is arranged for covering the open end and has a plurality of arcuate slots evenly spaced about the surface thereof. A rib lies under these slots for restricting the size of the opening to allow a metered amount of brewing water to be passed to the coffee grounds and for preventing backup of coffee grounds. A plurality of arcuate slots are arranged in evenly spaced fashion on the bottom surface of the closed end of the cylindrical body. A plurality of ribs are arranged for overlying the slots on the bottom of the cylinder. An overflow opening is centrally arranged on the spreader plate and communicates with a bypass tube through the cylindrical body so that overflow heated water can pass through the basket without contacting the coffee grounds.

BRIEF DESCRIPTION OF THE DRAWINGS

The above objects, features and advantages along with other objects, features and advantages of the present invention will become apparent from the following detailed description of the present invention in conjunction with the drawings as follows:

FIG. 5 is a perspective view of the coffee basket without the spreader plate;

FIG. 6 is a bottom plan view of the basket;

FIG. 7 is an enlarged sectioned view of detail VII encircled in FIG. 6;

DESCRIPTION OF THE INVENTION

Figure 1:
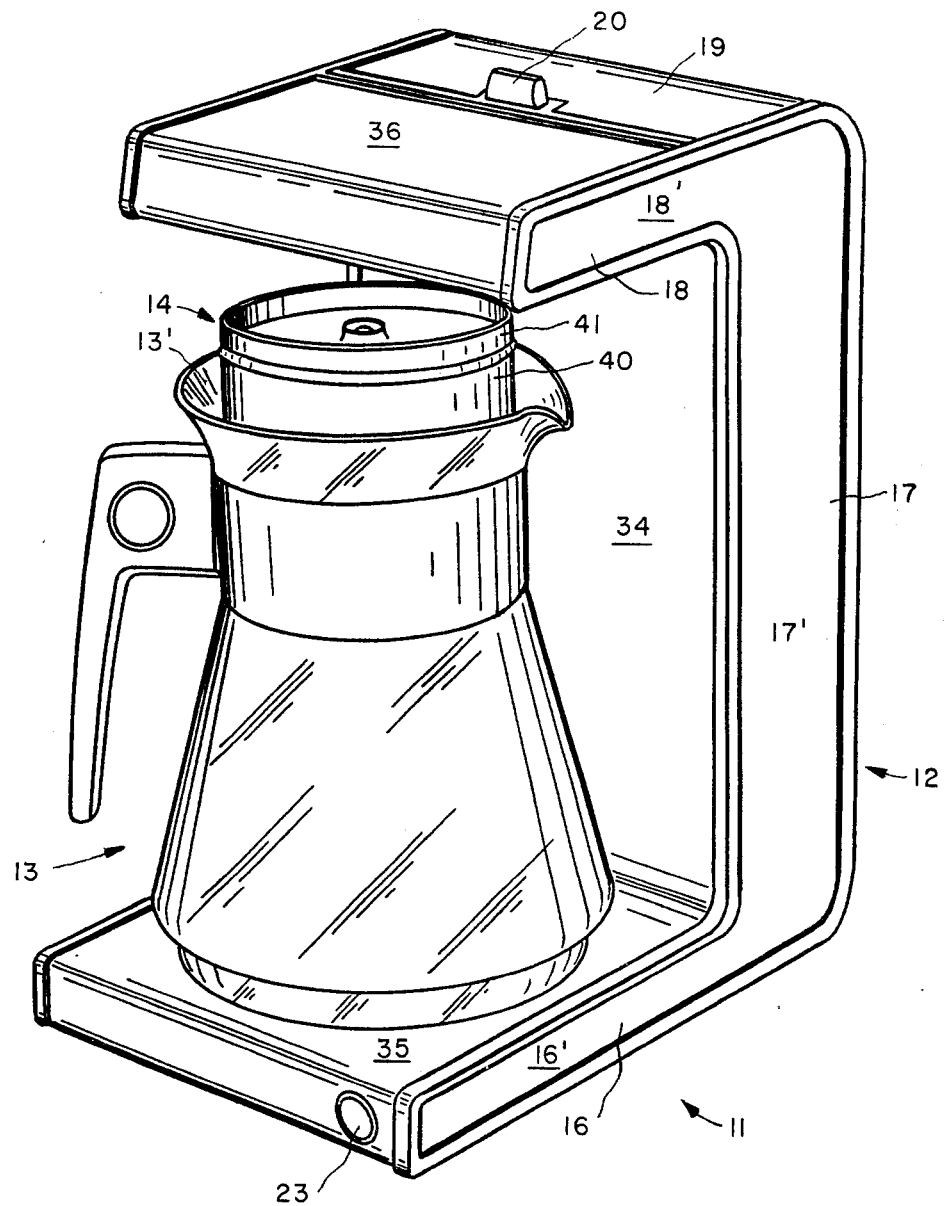
FIG. 1 is a perspective view showing the coffee maker of the present invention with the beaker holding the coffee basket in place on the coffee stand.
Figure 2:
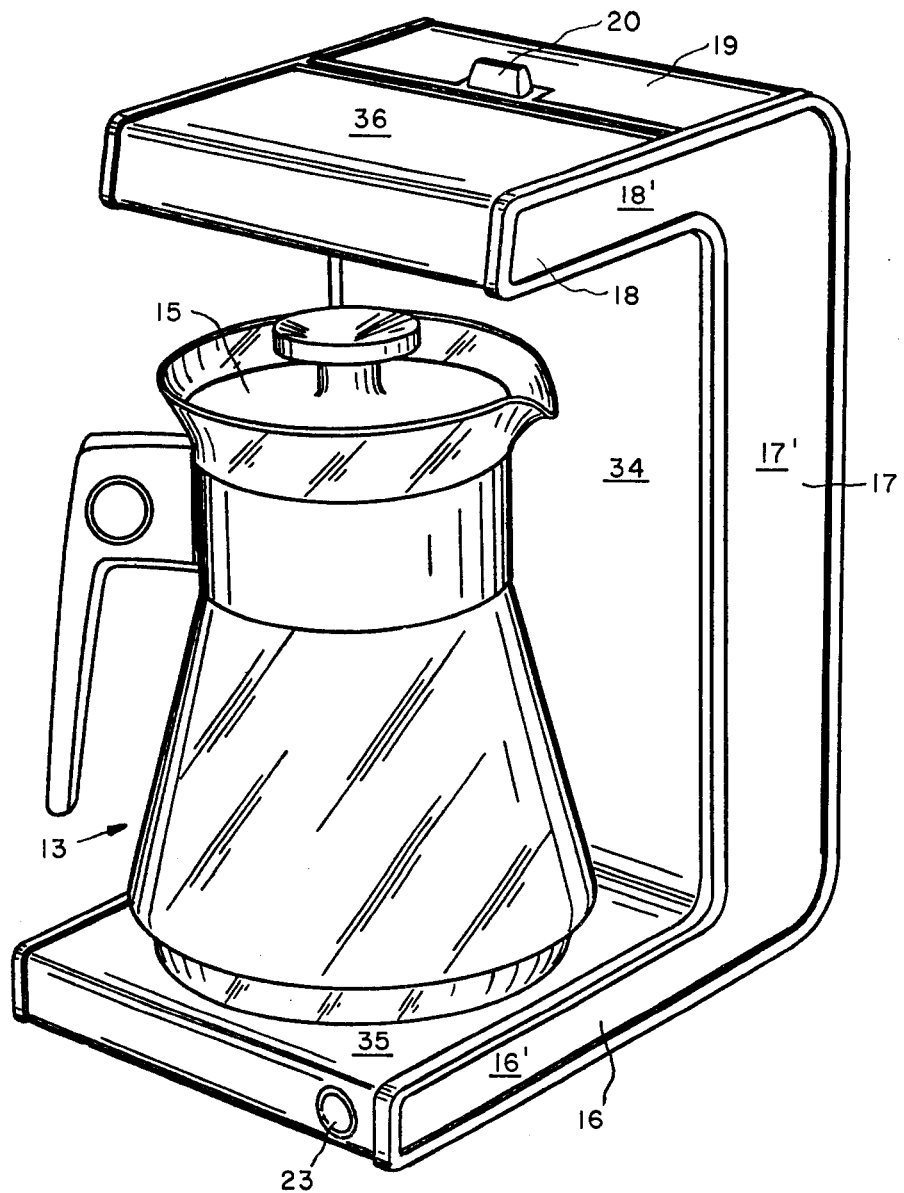
FIG. 2 is a similar view to FIG. 1 showing the coffee maker in perspective view with the basket having a pouring lid in place of the coffee basket.
Figure 3:
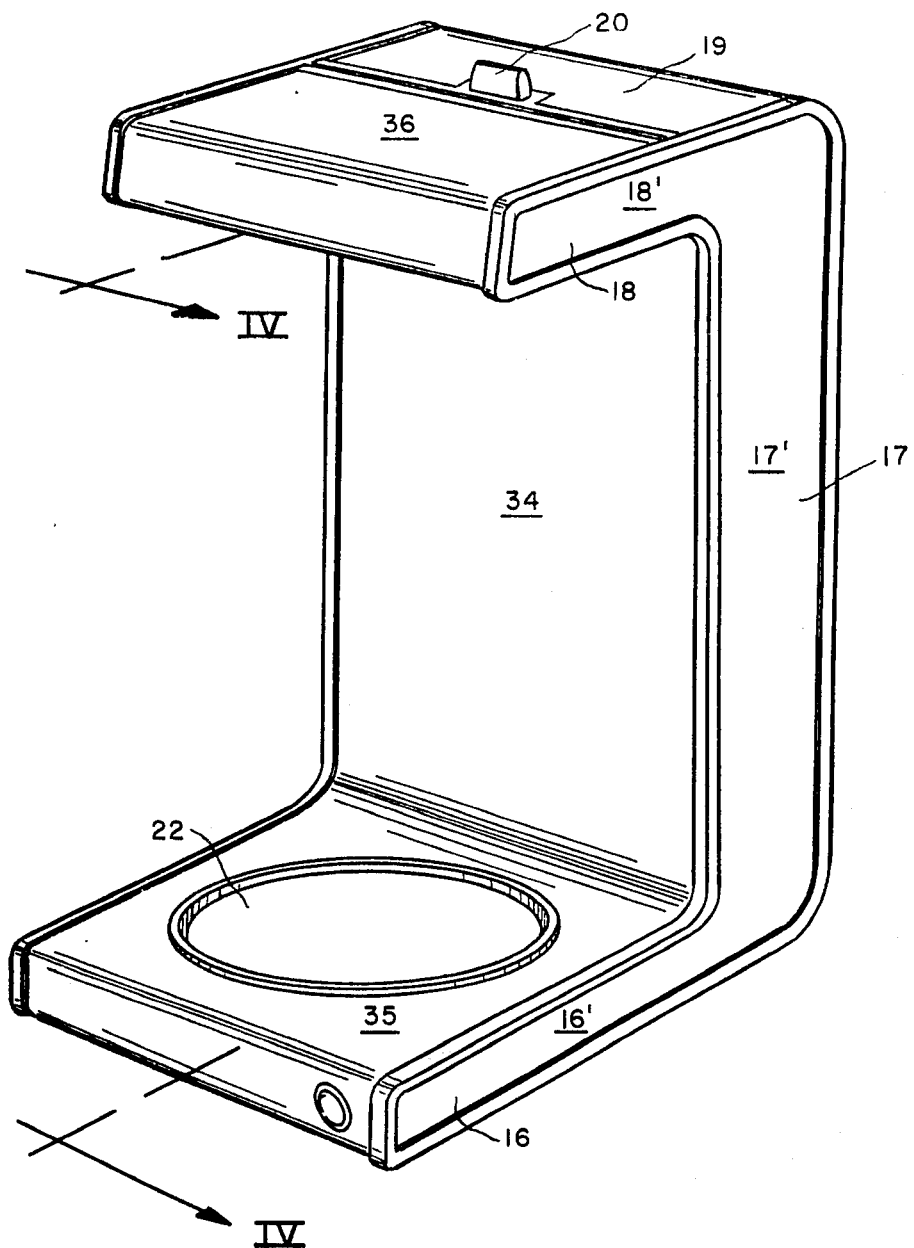
FIG. 3 is a perspective view of the stand of the coffee maker without the beaker and coffee basket.
Figure 12:
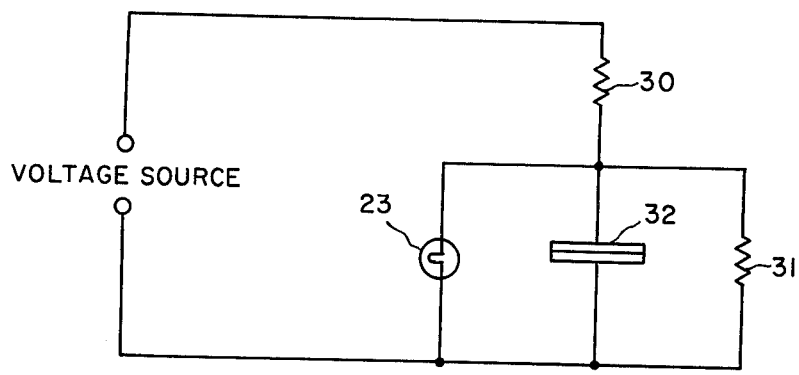
FIG. 12 is a schematic circuit diagram showing the arrangement of elements.

Referring now in detail to the accompanying drawings the coffee maker, indicated generally as reference numeral 11 comprises three main elements: a substantially C-shaped stand 12, a beverage receptacle or beaker 13, and a coffee basket 14. A beaker lid 15 is also provided for use when pouring the fully prepared beverage from the beaker.

Figure 4:
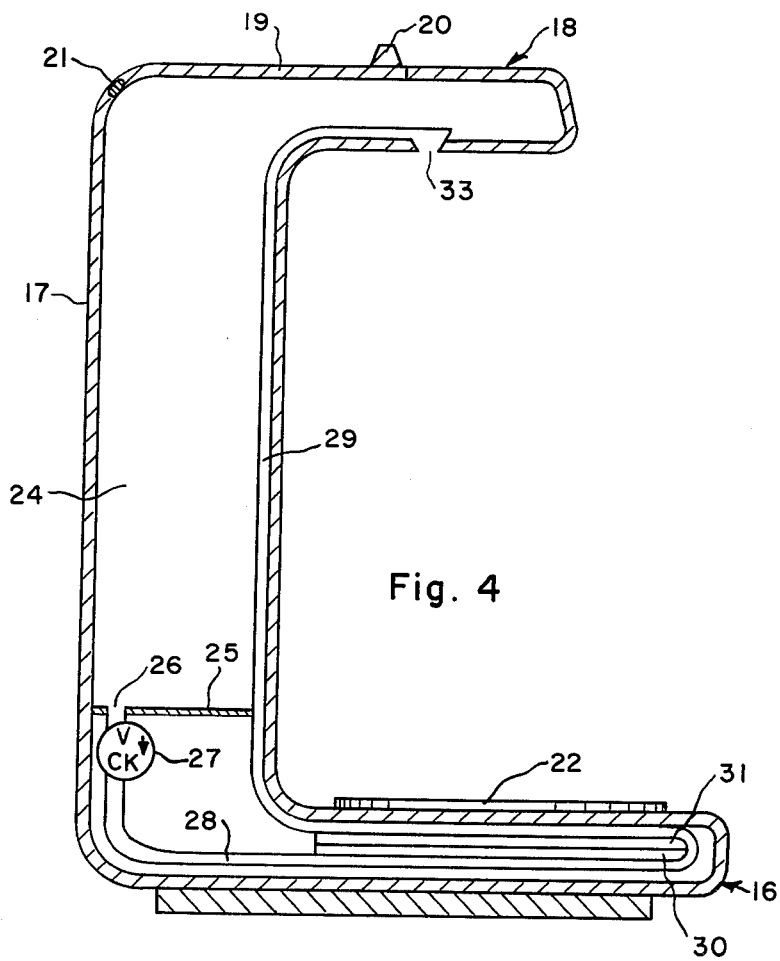
FIG. 4 is a cross-sectional view of the stand taken along lines IV—IV of FIG. 3.
Figure 8:
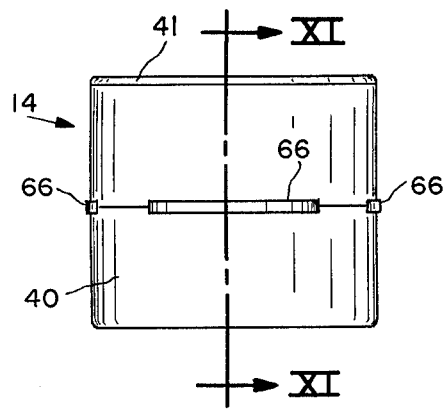
FIG. 8 is a side elevational view of the basket showing the spreader plate in place.
Figure 9:
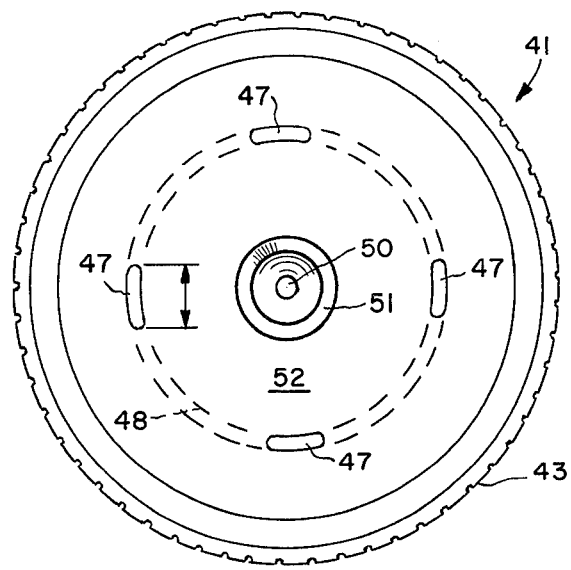
FIGS. 9 and 10 show the spreader plate in top plan view and side elevational view respectively.
Figure 10:
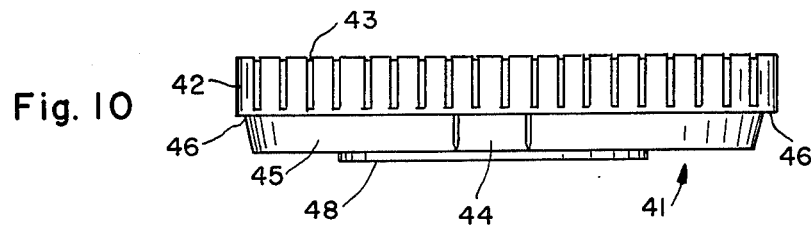

The stand 12 has the familiar C-shape configuration formed by two horizontal lying leg segments 16 (bottom) and 18 (top) respectively connected by a verticle section 17. FIG. 4 shows the stand in sectional view from which it can be seen that a space 24 forms a reservoir within the verticle section 17 for reception of cold water. The reservoir ends at a bottom surface 25 which is provided with an opening 26 and one-way valve 27. A conduit 28 is connected at one end to the opening and valve 26, 27 passing under hot plate 22 and connected at the other end to supply passage 29.

Figure 11:
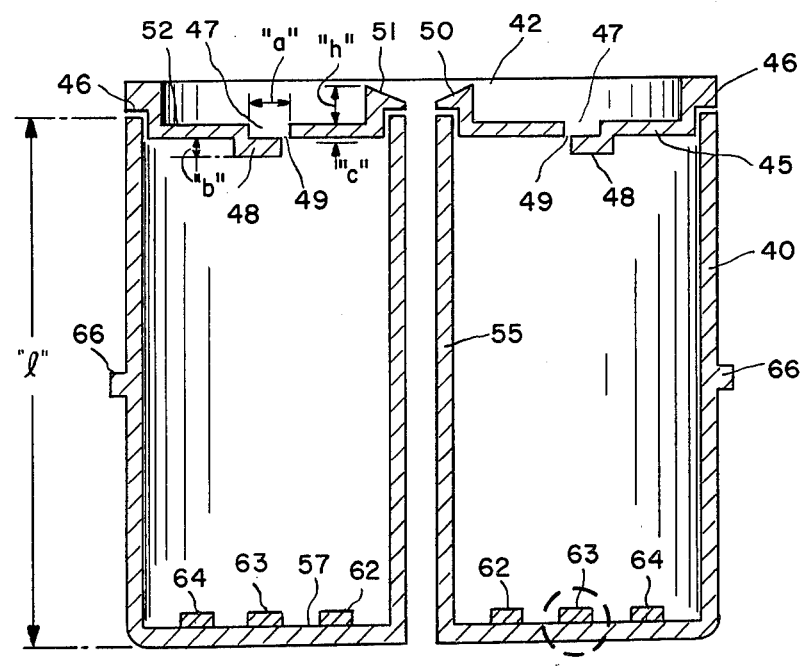
FIG. 11 is a sectional view of the basket with spreader plate taken along line XI—XI of FIG. 8.

The water passing through conduit 28 is heated by heating element 30 in contact therewith and pumped into supply passage 29. FIG. 11 is a circuit diagram showing the arrangement of the heating element 30 with an additional heating element 31 used for warming the hot plate 22, a thermostat 32 and indicator light 23 which lights when pumping is complete. An 1100 to 1500 watt heating element would be used to heat and pump the water through conduit 28 while an 80 watt heating element is used to warm the hot plate. Thermostat 32 is arranged in series with the heating element 30 so that when all brewing water has been pumped to the passage 29 it will open diverting current to the light 23 and element 31 thus indicating that pumping is complete and the hot plate is on. The cold water passing from the reservoir into conduit 28 and heated and pumped into supply passage 29 is to be delivered to outlet spout 33.

A cover 19 is hingedly arranged to pivot about pin 21 for access to the reservoir 24. A handle 20 may be provided on the cover 19.

The housing of the stand enclosing the reservoir and heating and pumping area may be formed of a phenolic material while the hot plate 22 and exterior trim may be metal such as sheet aluminum. The water reservoir, as well as the coffee basket with spreader plate, the serving lid and the handle for the beaker may be polyproplene.

Inside surface 34, bottom surface 35 and a portion of the top surface 36 may be formed of the sheet metal trim. The cover 19 and side walls 16', 17' and 18' of elements 16, 17 and 18 of the stand respectively may be formed of phenolic material.

The coffee basket which forms the novel features of the present invention is shown in detail in FIGS. 5–11. The basket comprises a main cylindrical body 40 and a spreader plate 41.

Spreader plate 41 has an upstanding wall or rim 42 having a knurled periphery 43 for easy finger-grip manipulation. The diameter of the spreader plate is stepped down to form insert section 45 which is arranged to be inserted into the cylindrical basket body 40. Shoulder 46 of upstanding wall 42 forms an abuttment for the top 54' of the cylindrical wall 40 of the basket. Ridges 44 provide a snug-fit for the spreader plate when inserted into the cylindrical body 40.

As previously noted, one of the chief problems with brewing coffee is meeting the requirement of passing all water through the coffee grounds in a maximum of 8 minutes using regular grind so as not to extract bitters. Also of importance is the need to prevent coffee grounds from entering the final brew, which is usually caused by foaming or expansion of the coffee grounds when contacted by the heated water. In order to meet these needs the present invention provides a spreader plate having a plurality of arcuately shaped slots located in the surface of the spreader plate evenly spaced so as to provide uniform distribution of the brewing water into the coffee grounds. A rib 48 located on the undersurface of the plate forms a thin elongated gap 49 so as to limit the amount of water allowed to pass to the coffee grounds and to help prevent undesired backup of coffee grounds. As seen in FIG. 11 the width $a$ of slots 47 is preferably one-eighth of an inch while the length $d$ (see FIG. 9) is preferably one-quarter inch. The gap 49 is approximately two one-hundredths of an inch as indicated by dimension $c$ and the height $b$ of rib 48 is approximately seven one-hundredths of an inch.

While a variety of patterns of slots having various lengths has been experimented with it has been empirically found that four slots spaced at 90° intervals with their center line approximately one-inch radially spaced from the center of the spreader plate provides optimum results.

In order to complete brewing in maximum time limit a bypass is provided comprising an overflow 50 in the center of the spreader plate having a conically-shaped opening 51 and a height $h$ of approximately one-quarter of an inch from the surface 52 of the spreader plate 41. A hollow shaft 55 (bypass tube) is centrally and axially arranged through the cylindrical body so as to be aligned with the overflow opening 50 in the spreader plate when the spreader plate is in place covering the open end 56 of the body 40. Tube 55 is preferably formed integrally with the body 48.

Remote from edge 54', the body 40 has a closed bottom surface 57 which is provided with a plurality of slots 58 arranged in concentric rings 59, 60 and 61, (see FIG. 6). These slots are also arcuately shaped having a length of approximately three-eighths of an inch and a width of approximately one-eighth of an inch. The number of rings of slots and the number of slots in each ring will of course vary with the size of the basket — however, one such basket which has been found to give satisfactory results is provided with eight slots in ring 59, 12 slots in ring 60 and 18 slots in ring 61. On the inner surface of bottom 57, each ring is provided with a rib 62, 63 and 64 respectively shown more fully in cross-sectional detail of FIG. 7.

Circumferential shelf 66 is provided approximately midway of the length of the cylindrical body so as to provide abutment means when the basket is inserted in the open mouth of the beaker 13.

In operation, a known paper filter is placed in the coffee basket resting on the top surfaces of ribs 62, 63, 64. The basket is then filled with the desired amount of coffee grounds. Using the beaker 13 as a measure, an approximate amount of brewing water may be supplied to the reservoir 24. The basket is then placed in the open mouth 13' of the beaker 13 with spreader plate 41 in place closing the open end of the cylindrical body 40. The beaker with basket is then placed on the hot plate 22. The water thus contained in reservoir 24 will pass through valve 27 into conduit 28 and be heated and pumped by heating element 30 up through passage 29 through outlet 33 dripping onto spreader plate 41 into the receiving space within rim 42. The heated water will collect on surface 52 of spreader plate 41 and will pass through gap 49 via slot 47 and rib 48 to be distributed through the coffee grounds. Having passed through the coffee and the paper filter placed on the bottom surface of the cylindrical body, the coffee brew will then pass around ribs 62, 63 and 64 and eminate through the plurality of slots 58 collecting in the beaker 13.

Figure 13:
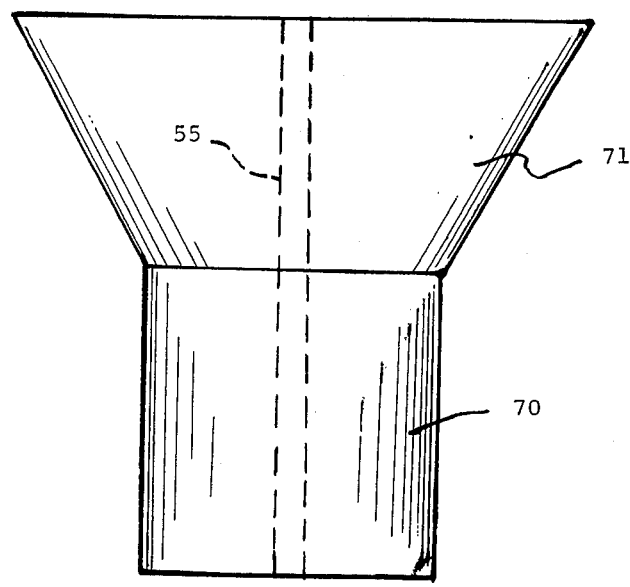
FIG. 13 is a side view of another embodiment of the basket.

The unique design of spreader plate and coffee basket has been found to produce very desirable results in that the heated water is uniformly and evenly distributed through the slots to the coffee grounds via elongated gap 49 as a result of rib 48. The size and number of slots has been found to allow the water to pass through the grounds in the optimum time period and the arrangement of slots 48 permits rapid passage of the water. The spreader plate has also been found to minimize the deleterious effect of foaming. While the body of the basket has been described as being cylindrical, other shapes may be effectively used. For example the basket shown in FIG. 13 having a bottom cylindrical section 70 and upper conical section 71 would be as effective eliminating the need for circumferential shelf 66.

Accordingly a novel coffee maker using a unique coffee basket has been devised which produces satisfactory results.

While the invention has been described and illustrated with respect to a certain preferred embodiment which gives satisfactory results, it will be understood by those skilled in the art after understanding the purpose of the invention that various other changes and modifications may be made without departing from the spirit and scope of the invention.

What is claimed is:

1. In a coffee making apparatus operable with water, a receptacle for containing brewed coffee and a basket for containing ground coffee beans that is removably placed in the upper part of said receptacle, the apparatus including a reservoir for containing a quantity of said water, a frame, a base part of said frame for supporting said receptacle, a spout on said frame for delivering water into said receptacle, and means carried by said frame for heating water from said reservoir and flowing same through said spout, the improvement in combination therewith wherein said basket comprises a cylindrical body with an open top end and a bottom end perforated with a plurality of spaced apertures, a spreader plate for covering said top end, said plate perforated with a plurality of apertures formed as slots which are spaced apart from each other, said plate further comprising a rib below and partially closing each slot thus providing a narrow gap for passage of water, said plate having a top surface with a rim extending upward a predetermined height from said surface defining a receiving space within said rim for water from said spout, the plate further including a first overflow aperture having an opening situated above said top surface at a height less than that of said rim, the basket further comprising a second overflow aperture in the bottom end and a duct extending through said body for communicating said second overflow aperture in the bottom end with said first overflow aperture in the spreader plate, whereby water in the receiving space at the height above the opening in said first overflow aperture will flow through the said first aperture and duct without contacting ground coffee in said basket.

2. The domestic coffee maker according to claim 1 wherein said spreader plate is provided with four arcuately shaped slots spaced 90° apart having their axes lying at the same radius from the center of said plate.

3. The domestic coffee maker according to claim 2 wherein said slots located in said spreader plate are approximately one-quarter of an inch long and one-eighth of an inch wide being spaced from the center of said spreader plate by approximately one-inch.

4. The domestic coffee maker according to claim 3 wherein the space between the rib covering said slot in said spreader plate is approximately two-one-hundreds of an inch from the under surface of said spreader plate.

5. The domestic coffee maker according to claim 1 wherein said slots located in the bottom surface of said body are approximately three-eighths of an inch long and one-eighth of an inch wide.

6. The domestic coffee maker according to claim 1 wherein the bottom of said basket is provided with three rings of slots, there being eight slots in the first ring, 12 slots in the second ring and 18 slots in the third ring.

7. Apparatus according to claim 1 wherein each of said ribs is positioned such that said gap faces inwardly, and water flowing downward through said slot, then flows inwardly through said gap.

8. Apparatus according to claim 1 wherein said apertures in the bottom end are slots spaced apart from each other the basket further comprising a circular rib above each ring of slots defining between the sides of each slot and the adjacent sides of a rib narrow gaps for passage of fluid.

* * * * *